3,223,706
2,3-DIMERCAPTO-QUINOXALINES
Klaus Sasse, Cologne-Stammheim, Richard Wegler, Leverkusen, and Günter Unterstenhöfer, Opladen, Germany, assignors to Farbenfabriken Bayer Aktiengesellschaft, Leverkusen, Germany, a German corporation
No Drawing. Filed Jan. 3, 1962, Ser. No. 164,190
Claims priority, application Germany, Jan. 26, 1961, F 33,068
5 Claims. (Cl. 260—250)

This invention relates to compounds of the structure

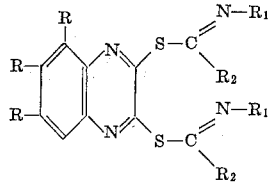

wherein R is a member of the group consisting of hydrogen, halogen, nitro, trifluoromethyl, a lower alkyl radical up to 4 carbon atoms and a a lower alkoxy radical; $R_1$ is a member of the group consisting of hydrogen, a hydroxy group, an alkyl, cycloalkyl, aryl, chloroaryl, aralkyl, alkylsulphonyl, arylsulphonyl radical and a primary and secondary amino group, and $R_2$ is a member of the group consisting of hydrogen, an alkyl, cycloalkyl, aralkyl, aryl, alkoxy, aryloxy, alkylmercapto, arylmercapto radical and a primary and secondary amino group.

More specifically this invention deals with compounds of the structure

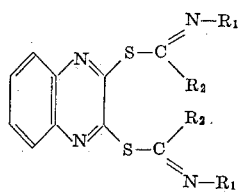

wherein $R_1$ is selected from the group consisting of an alkyl, chlorophenyl, arylamino and an arylsulfonyl radical and $R_2$ is selected from the group consisting of the phenyl, alkoxy and a chlorophenylamino, dialkylamino and an arylmercapto radical. The compounds of the invention are prepared by reacting 2,3-dimercapto-quinoxalines of the structure

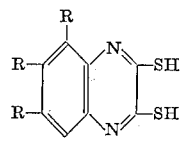

with a compound of the structure

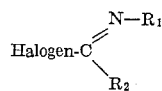

resulting in a compound of the structure

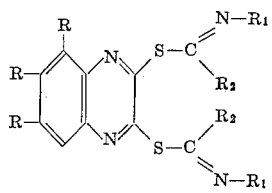

wherein R is a substituent which is inert to acid halides such as hydrogen, halogen, nitro, trifluoromethyl, a lower alkyl radical up to 4 carbon atoms and a lower alkoxy radical; $R_1$ is a member of the group consisting of hydrogen, a hydroxy group, an alkyl, cycloalkyl, aryl, chloroaryl, aralkyl, alkylsulfonyl, arylsulfonyl radical and a primary and secondary amino group and $R_2$ is a member of the group consisting of hydrogen, an alkyl, cycloalkyl, aralkyl, aryl, hydrocyclic, alkoxy, aryloxy, alkylmercapto, arylmercapto radical and a primary and secondary amino group.

As starting materials which may be used for the reaction according to the invention there may be mentioned for example: carboxylic acid-imide halides, hydroxamic acid halides (hydroximic acid halides), carboxylic acid-hydrazide halides or their derivatives with carbonyl compounds, carboxylic acid-N-sulphonyl-imide halides, imidocarbonic acid ester halides, imido-thiocarbonic acid ester halides, imido-carbonic acidamide halides, imidocarbonic acidhydrazide halides or their isomers.

More specifically, the process according to the invention is preferably carried out in the presence of an acid-binding agent such as alkali metal or alkaline earth metal oxides, hydroxides, or carbonates, tertiary amines and the like. On the other hand, it is also possible to produce first the metal or ammonium salts of 2,3-dimercapto-quinoxaline or its derivatives substituted in the nucleus and, subsequently, to react them with the acid derivatives mentioned above without the addition of an acid acceptor. Surprisingly, it is very often possible to carry out the reaction according to the present process with alkali metal salts of 2,3-dimercapto-quinoxaline in an aqueous medium or in a mixture of water and a water-miscible solvent, although a great number of the above acid halides is rapidly hydrolysed by water.

Furthermore, the compounds of the invention may be prepared by reacting a 2,3-dimercapto-quinoxaline of the formula

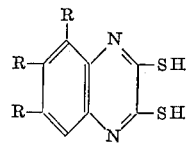

with 2 mols of carbodiimide of the structure

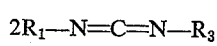

resulting in a compound of the structure

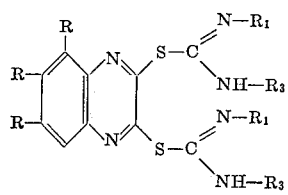

wherein R is a member of the group consisting of hydrogen, halogen, nitro-trifluoromethyl, a lower alkyl radical up to 4 carbon atoms and a lower alkoxy radical; $R_1$ and $R_3$ are members of the group consisting of an alkyl, cycloalkyl, aryl, chloroaryl and an aralkyl.

The reactions proceed at a high speed even in the absence of any additives and at low temperatures, if the process is carried out in a suitable solvent for the barely soluble 2,3-dimercapto-quinoxaline. Dimethyl formamide is especially suitable.

The compounds of this invention are useful in the field of pest control agents and show, in particular, an outstanding acaricidal activity.

The new 2,3-dimercapto-quinoxalines being used as pest control agents, are chiefly for plant protection. They may be employed in compositions including diluents, extenders, fillers and conditioners.

Example 1

19.4 g. of 2,3-dimercapto-quinoxaline are dissolved in a solution of 8 g. of sodium hydroxide in 75 ml. of water, the reaction mixture is treated first with 200 ml. of acetone, subsequently dropwise below 0° C. (cooling with a mixture of ice and sodium chloride) with 28 g. of N-methyl-benzimide chloride. In order to complete the reaction, the mixture is afterstirred below 0° C. for ½ hour and then with ice-cooling for a further hour, subsequently treated with water and the precipitated solid product filtered off with suction. After drying of the precipitate, there are obtained, 28 g. of a compound of the formula

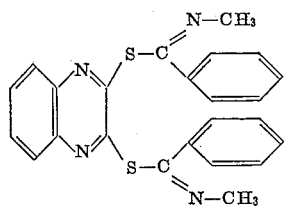

which, after re-crystallisation from alcohol, melts at 133° C.

The procedure of Example 1 was followed but reacting the 6-methyl-2,3-dimercapto-quinoxaline, the 6-chloro-2,3-dimercapto-quinoxaline and the 6-methoxy-2,3-dimercapto-quinoxaline with N-methylbenzimide.

The following compounds are obtained:

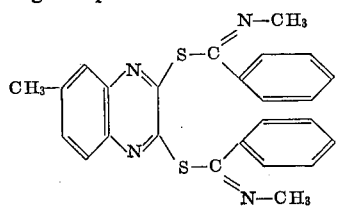

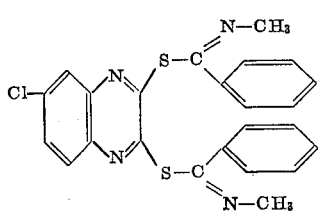

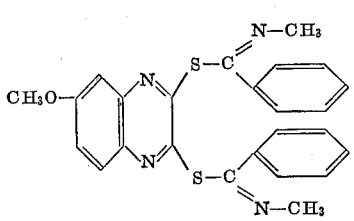

Example 2

14.5 g. of 2,3-dimercapto-quinoxaline are dissolved in a solution of 6 g. of sodium hydroxide in 70 ml. of water. The mixture is diluted with 200 ml. of acetone, 30 g. of p-chlorophenyl-imidocarbonic acid-methyl ester chloride are then added dropwise below 15° C. with stirring and slight external cooling, the reaction mixture is afterstirred at room temperature for one hour, treated with water, the precipitate formed is filtered off with suction and dried. In this way, 24 g. of a product of the formula

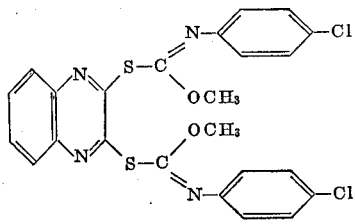

are obtained. After re-crystallisation from glycol-monomethyl ether, the compound shows a decomposition point of about 200° C.

Example 3

19.4 g. of finely powdered 2,3-dimercapto-quinoxaline are suspended in 175 ml. of dimethyl formamide. The suspension is stirred, until the solid compound has almost completely dissolved, and 52 g. of bis-(p-chlorophenyl)-carbodiimide are then introduced into the reaction mixture in small portions whereupon the initially brown-black solution brightens more and more without noticeable heat effect. The mixture is then after-stirred at room temperature for ½ hour, diluted with water and, finally, the precipitated yellow product filtered off with suction. A 2,3-dimercapto-quinoxaline derivative of the formula

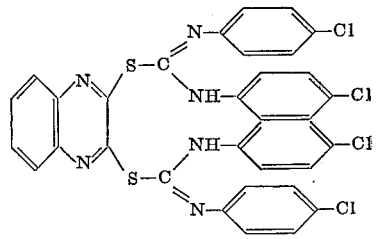

is obtained in practically quantitative yield which, after re-crystallisation from butanol, melts at 166–167° C.

Example 4

9.7 g. of 2,3-dimercapto-quinoxaline are dissolved in a solution of 4 g. sodium hydroxide in 50 ml. of water. This mixture is diluted with 150 ml. of acetone and subsequently dropwise treated in a temperature range between —5° and 0° C. with 17.7 g. of pyruvic acid of the phenylhydrazide chloride of the formula

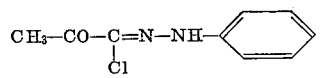

In order to complete the reaction the mixture is stirred for an hour. After diluting with water the 2,3-dimercaptoquinoxaline compound is filtered out and recrystallized in a dioxane/methanol mixture to give 16 g. of a compound of the formula

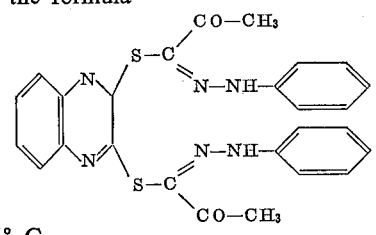

M.P. 185° C.

Example 5

The procedure of Example 4 was followed, but reacting 9.7 g. of 2,3-dimercapto-quinoxaline with 26.4 g. of N(p-tolylsulfonyl)-benzimide chloride of the formula

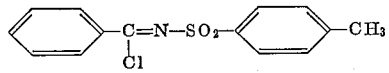

there are obtained 20 g. of a compound of the formula

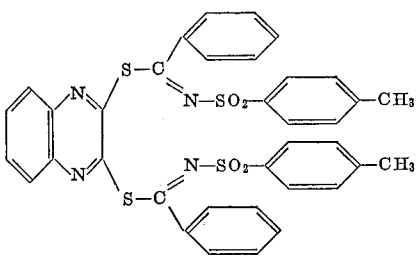

melting point 78–80° C.

Example 6

According to the procedure of Example 4 there are obtained from 9.7 g. of 2,3-dimercapto-quinoxaline and 18.3 g. of phenylimino-carbonic-acid-dimethylamide-chloride of the formula

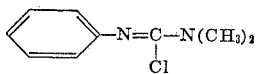

15 g. of a compound of the formula

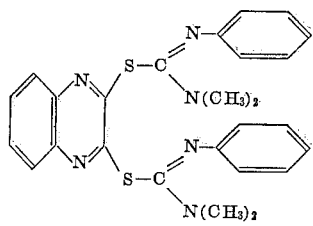

a compound which solidifies glass-like without crystallizing.

Example 7

In the procedure according to Example 4, 9.7 g. of 2,3-dimercapto-quinoxaline and 41.4 g. of p-chlorophenylimino-thiocarbonic acid ester chloride of pentachlorophenyl of the formula

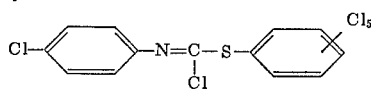

there are obtained 25 g. of a compound of the formula

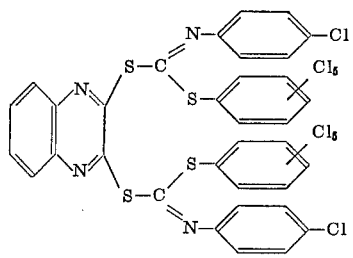

melting point 182° C., recrystallized from carbontetrachloride/ligroin.

In the same manner the compound of the following formula is obtained (from p-chlorophenylimide-carbonic-acid-diethylamidechloride)

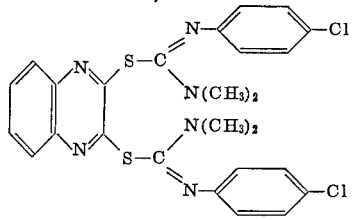

and from the nitro, chloro and trifluoromethyl compound of the 2,3-dimercapto-quinoxaline there are obtained the following compounds of the formulae

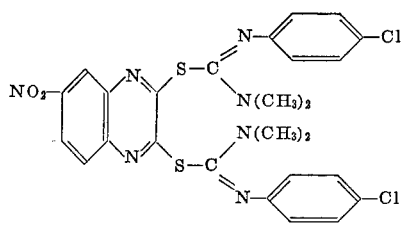

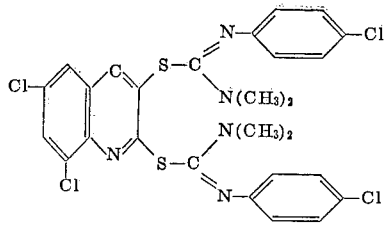

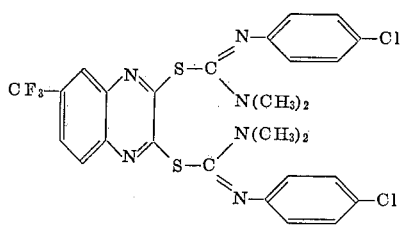

Example 8

According to the procedure of Example 4 there are obtained from 9.7 g. of 2,3-dimercapto-quinoxaline and 21.2 g. of phenylhydrazide-chloride of benzoic acid 18 g. of a compound of the formula

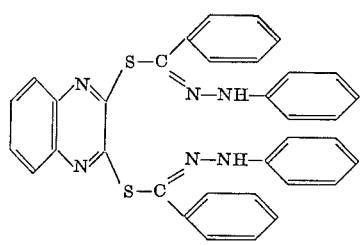

melting point 156° C., recrystallized from carbontetrachloride.

What is claimed is:
1. A compound of the formula

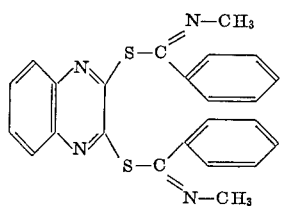

2. A compound of the formula

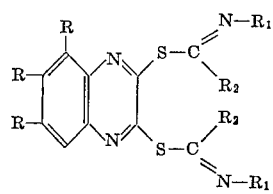

wherein R is a member selected from the group consisting of hydrogen, chloro, nitro, trifluoromethyl, lower alkyl containing up to 4 carbon atoms, and lower alkoxy; $R_1$ is a member selected from the group consisting of a hydrogen, lower alkyl, phenyl, and chlorophenyl; and $R_2$ is a member selected from the group consisting of hydrogen, lower alkyl, phenyl, and chlorophenyl.

3. A compound of the formula
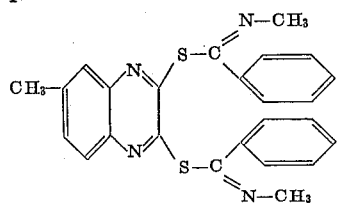
4. A compound of the formula
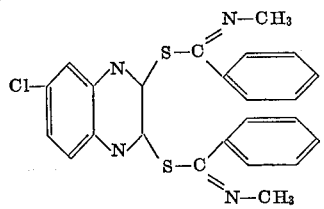
5. A compound of the formula
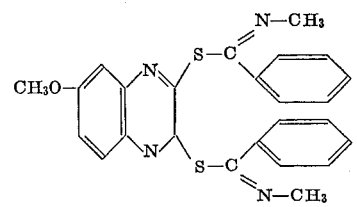
References Cited by the Examiner
UNITED STATES PATENTS
3,040,046   6/1962   Sasse et al. _____ 260—250
NICHOLAS S. RIZZO, *Primary Examiner.*
IRVING MARCUS, WALTER A. MODANCE,
*Examiner.*